United States Patent [19]

Halper

[11] 4,379,196

[45] Apr. 5, 1983

[54] PROTECTIVE COATING FOR ALUMINUM AND METHOD OF MAKING

[75] Inventor: Warren Halper, Hendersonville, N.C.

[73] Assignee: General Electric Company, Schenectady, N.Y.

[21] Appl. No.: 256,895

[22] Filed: Apr. 23, 1981

[51] Int. Cl.$^3$ .......................... G02B 5/08; B32B 15/04
[52] U.S. Cl. ..................................... 428/213; 427/162; 427/163; 350/288; 428/215; 428/216; 428/336; 428/428; 428/429; 428/433; 428/447; 428/450; 428/469; 428/472
[58] Field of Search ............... 428/429, 433, 447, 469, 428/472, 450, 428, 213, 216, 336, 215; 427/163, 162; 350/288

[56] References Cited

U.S. PATENT DOCUMENTS

| | | | |
|---|---|---|---|
| 2,729,551 | 1/1956 | Cohn | 156/903 |
| 3,445,267 | 5/1969 | Layne | 427/163 |
| 3,499,780 | 3/1970 | Etherington | 428/450 |
| 3,625,737 | 12/1971 | Ricchezza | 428/450 |
| 4,027,073 | 5/1977 | Clark | 428/412 |

*Primary Examiner*—Ellis P. Robinson
*Attorney, Agent, or Firm*—Ernest W. Legree; Philip L. Schlamp; Fred Jacob

[57] ABSTRACT

Composite coating on aluminum article comprising base layer formed from alkali metal silicate compound and outer layer formed of a dispersion of colloidal silica and a silicone resin is tightly adherent to the aluminum surface, provides protection from corrosion and is abrasion resistant. Improved aluminum reflectors are made by suitably brightening the surface to provide a highly specular reflective surface, applying a base coating of a silicate solution on the thus treated surface, heating the thus applied base coating to remove the chemically bound water therefrom, rinsing the base coating to remove alkali metal ions therefrom, applying an outer coating of the colloidal-silica-silicone resin composition, and drying the latter coating.

7 Claims, No Drawings

PROTECTIVE COATING FOR ALUMINUM AND METHOD OF MAKING

The present invention relates to protective coatings for aluminum articles and in particular to aluminum reflectors with a specular reflecting surface, and to a method for providing such coatings.

A number of methods are known for providing aluminum articles with protective coatings. For example, anodizing the aluminum has been used for producing an aluminum oxide film on the aluminum surface, but such a method is limited by the aluminum alloy to which it is applied, since some alloys upon anodizing may adversely affect the brightness, color or reflectivity of the aluminum substrate. The application of clear organic films such as acrylics, polyesters and epoxies is also limited due to inadequate adhesion of such materials to the bare aluminum surface. Temperature extremes as well as exposure to ultraviolet light and humidity can cause serious degradation of the films themselves in addition to loss of adhesion. While certain inorganic films employed in the past do not degrade by ultraviolet exposure and are capable of withstanding higher temperatures than organic films, their adhesion to the aluminum surface has not been fully satisfactory.

It is an object of the present invention to provide a protective coating for aluminum articles which overcomes the above disadvantages of known coatings, and a method of making the same.

It is a particular object of the invention to provide a composite protective coating for aluminum articles, and particularly for such articles having a specular reflecting surface, wherein the coating is tightly adherent to and protects the aluminum from corrosion, is abrasion resistant, and substantially preserves the reflectivity, color and brightness of the aluminum surface.

Other objects and advantages will become apparent from the following description and the appended claims.

With the above objects in view, the present invention in one of its aspects relates to an article comprising an aluminum substrate, a silica glass coating on the aluminum substrate tightly adherent thereto, and a second coating overlying the silica glass coating formed of a cured dispersion of colloidal silica in a silanol compound.

In another aspect, the invention relates to a method of producing the aforementioned aluminum article with the described composite coating thereon, the method comprising in one aspect the steps of cleaning the surface of the aluminum, applying a base coating of an alkali metal silicate solution on the thus cleaned surface, heating the thus applied base coating for a sufficient time and at a sufficient temperature for removing substantially all the chemically bound water therefrom and forming a hard, transparent silica glass coating tightly adherent to the aluminum surface, treating the thus formed base coating to remove substantially all the alkali metal ions therefrom, thereafter applying on the thus produced base coating a second coating comprising a mixture of colloidal silica and the partial condensate of a silanol compound, and curing the thus applied second coating.

In a preferred embodiment of the present invention for producing an aluminum reflector having a highly specular reflective surface, the aluminum member is initially mechanically buffed by any suitable means, cleaned by washing with alkaline and/or acid cleaning solutions, as required, and then rinsed in water. The aluminum surface is then subjected to a brightening treatment, suitably using a chemical brightening solution to provide thereon a highly specular reflecting surface, such treatment being disclosed, for example, in the patent to Cohn U.S. Pat. No. 2,729,551. After being rinsed in water, the aluminum reflector is then treated with a 50% nitric acid water solution to remove any smut which may have remained on the surface, and then rinsed in water. Shortly after the brightening step, and preferably immediately thereafter to avoid appreciable oxidation and/or contamination of the brightened surface, the aluminum reflector is coated with a base layer of a silicate film, typically to an average thickness of about 0.05 mil, the coating being usually applied by dipping the reflector in a solution comprising an alkali metal silicate and water.

The metal silicate compound may, for example, be potassium silicate. The water solution contains, in percent by weight, about 5–25% solids in the form of alkali metal oxide and silica, with a typical composition containing about 11% solids and 89% water. A satisfactory commercially available potassium silicate solution used in preparing the silicate coating bath has the following approximate composition in percent by weight:

|  | Percent |
| --- | --- |
| Potassium oxide, $K_2O$ | 8.3 |
| Silica, $SiO_2$ | 20.8 |
| Water | 70.9 |

To make the silicate coating bath, the following solution is provided, using the above-described commercial potassium silicate solution:

|  | Percent |
| --- | --- |
| Potassium silicate solution | 32.4 |
| Colloidal silica | 10.7 |
| Water | 56.9 |

The colloidal silica in the above composition is commercially available as 14.5% $SiO_2$ suspended in ammonia water solution.

After the aluminum member is removed from the silicate coating bath, the excess silicate solution thereon is removed, as by allowing it to drain off, and then the thus coated member is dried, either under ambient conditions or preferably under controlled conditions in an oven at about 20% relative humidity and at a temperature from 100° F. to 110° F. for about 10 minutes. Thereafter, the coated article is baked for about 10 minutes at about 530° F. In general, this baking step may be carried out in a temperature range of about 400° F.–600° F., with the baking time being longer the lower the temperature, e.g., about 5 minutes at 600° F. and about 15 minutes at 500° F.

The thus baked coated article after removal from the oven is treated for about 1½ minutes in a 1% nitric acid solution for the purpose of removing substantially all (e.g., at least about 90%) of the alkali metal ions therefrom, and the thus treated article is rinsed in water to remove the acid solution. Unless the alkali metal ions are substantially removed from the silica glass coating, there is a risk not only of the formation of an undesirable haze in the final coating but also inadequate adhesion of the outer coating to the base coating.

A disclosure relating to the above-described base coating and the method of making it and containing further details thereof is found in the patent to Etherington et al. U.S. Pat. No. 3,499,780, issued Mar. 10, 1970 and assigned to the same assignee as the present invention, and the disclosure thereof is accordingly incorporated herein by reference. The protective coating thus produced is a silica glass film and is known commercially by the registered trademark ALGLAS.

After the thus produced base coating is dried, the part is coated, such as by dipping, flow coating, spray-coating, or other suitable method, with the colloidal silica-silanol composition described more fully hereinafter.

It has been found in accordance with the present invention that applying on the above-described base coating a second coating comprising a dispersion of colloidal silica in a condensation product of silanol, such as monomethyltrisilanol, will provide a markedly improved composite protective coating on the aluminum substrate. Such a colloidal silica-silanol coating composition, known commercially by the trademark VESTAR, and the method of making the same, are disclosed in detail in the patent to Clark U.S. Pat. No. 4,027,073, issued May 31, 1977, and the disclosure thereof is accordingly incorporated by reference herein. As described therein, this coating composition (referred to herein also as VESTAR for the sake of simplicity) comprises a dispersion of colloidal silica in lower aliphatic alcohol-water solution of the partial condensate of a silanol of the formula $RSi(OH)_3$ in which R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$, the composition containing 10 to 50 weight percent solids consisting essentially of 10 to 70 weight percent colloidal silica and 30 to 90 weight percent of the partial condensate, the composition containing sufficient acid to provide a pH in the range of 3.0 to 6.0. As indicated in the aforementioned Clark patent, it is preferred to utilize all monomethyltrisilanol in formulating the composition. The final coating obtained from the described composition is defined herein, for the sake of simplicity, as a mixture of colloidal silica and the partial condensate of a silanol.

The colloidal silica is used in the form of an aqueous colloidal dispersion, the particle size of the silica preferably being in the range of 10 to 30 millimicrons. Such colloidal silica dispersions are well-known and commercially available under the trademark LUDOX, among others.

An example of a VESTAR coating composition which may be employed in practicing the present invention comprises a mixture of about 75 parts by weight of methyltrimethoxysilane, acidified with about 19 parts by weight of acetic acid, and about 126 parts by weight of a 50% solids basic colloidal silica dispersion. Further details of preparing and using such a composition and related compositions will be found in the aforementioned Clark patent. A coating composition of this type is also available commercially from Dow Corning Corp. under the designation VESTAR Q9-6503.

As previously described, the VESTAR coating composition is applied to the base ALGLAS coating by any suitable means, e.g., dipping, flow coating, spraying, or other method, the coating in a typical procedure then being air dried at room temperature at a relative humidity of about 50% for ½ hour or until dry to the touch. The coating is then baked for 30 minutes at a temperature of about 390° F. for curing the coating material. In general, curing times and temperatures in the range of about 300° F. for ½ hour to about 480° F. for about 5 minutes are typical for this purpose. In a usual case, sufficient VESTAR composition is used to provide a final coating on the Alglas of about 0.25 mil, as compared to a typical thickness of about 0.05 mil of the Alglas coating, it being understood, however, that these coating thicknesses may vary substantially while still providing satisfactory results.

Tests have indicated that the above-described composite coating on an aluminum surface provides improved results over those obtained by either coating used alone. Thus, it was found that a cleaned and brightened aluminum article having such a composite coating exhibited considerably less corrosion when subjected to a standard salt fog test for 100 hours than a similar article having only a VESTAR coating. The composite coating also provides excellent abrasion resistance. Particular improvement in the use of the described silica glass base coating in combination with the VESTAR coating appears to be in the application to formed articles having areas of relatively sharp ridges and grooves such as fluted aluminum reflectors, since in such areas cracking and inadequate adhesion are found to characterize VESTAR coatings used alone.

An additional advantage of the use of the described silica glass base coating is the manufacturing flexibility which it provides. After parts have been freshly brightened, they will rapidly degrade unless a protective coating is applied. When using a VESTAR coating prior to my invention, the freshly brightened parts had to be dried and the VESTAR coating was applied immediately. Now the freshly brightened parts need not be dried before applying the silica base coating since it utilizes water base materials. Then after the silica glass base coating has been applied, there is no degradation. If desired, the parts may be dried and the VESTAR coating applied right away. Alternatively, the parts may be stored for an indefinite period during which drying takes place and the VESTAR coating applied when convenient. Further since the silica glass film is colorless and clear, it does not alter the color, brightness, or reflectivity of the underlying surface which would have been achieved by the use of the VESTAR coating alone.

It will be understood that while aluminum has been referred to as the substrate on which the composite coating is applied, aluminum alloys of various types as well as pure aluminum are considered applicable in practicing the invention, and as used in the claims, the term "aluminum" is intended to include relatively pure aluminum as well as alloys of aluminum in which aluminum is the principal metal. Further, the invention includes within its scope such aluminum articles whether or not of reflective nature.

Although the invention has been described with reference to providing the base silica glass coating on a cleaned and/or brightened aluminum surface, the invention also includes within its scope the application of the base coating to an aluminum surface having an aluminum oxide film thereon, such as an anodic oxide film, for example, as disclosed in the patent to Ricchezza et al. U.S. Pat. No. 3,625,737, assigned to the same assignee as the present invention.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A corrosion and abrasion resistant composite reflective aluminum article comprising an aluminum substrate, a silica glass coating on said aluminum substrate tightly adherent thereto, and a second coating overlying said silica glass coating comprising a mixture of colloidal silica and the partial condensate of a silanol.

2. An article as defined in claim 1, said aluminum substrate having a specular reflecting surface.

3. An article as defined in claim 1, wherein said second coating is obtained from a cured composition comprising a dispersion of colloidal silica in a partial condensate of monomethyltrisilanol.

4. An article as defined in claim 1, said silica glass coating being substantially free of alkali metal ions and hydrates.

5. An article as defined in claim 2, said specular reflecting aluminum surface being substantially free of an aluminum oxide film.

6. An article as defined in claim 1, said silica glass coating having a thickness of not more than about 0.2 mil.

7. An article as defined in claim 6, said second coating being substantially thicker than said silica glass coating.

* * * * *